United States Patent
Nishikawa et al.

(10) Patent No.: US 10,096,811 B2
(45) Date of Patent: *Oct. 9, 2018

(54) SEPARATOR FOR A NON-AQUEOUS SECONDARY BATTERY AND NON-AQUEOUS SECONDARY BATTERY

(71) Applicant: TEIJIN LIMITED, Osaka-shi, Osaka (JP)

(72) Inventors: Satoshi Nishikawa, Iwakuni (JP); Takashi Yoshitomi, Iwakuni (JP); Atsuhiro Otsuka, Iwakuni (JP); Ayumi Iwai, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/352,857

(22) PCT Filed: Oct. 19, 2012

(86) PCT No.: PCT/JP2012/077131
§ 371 (c)(1),
(2) Date: Apr. 18, 2014

(87) PCT Pub. No.: WO2013/058367
PCT Pub. Date: Apr. 25, 2013

(65) Prior Publication Data
US 2014/0242444 A1    Aug. 28, 2014

(30) Foreign Application Priority Data

Oct. 21, 2011 (JP) ................................ 2011-231833

(51) Int. Cl.
*H01M 2/16* (2006.01)
*H01M 2/02* (2006.01)
*H01M 10/0525* (2010.01)

(52) U.S. Cl.
CPC ....... *H01M 2/1686* (2013.01); *H01M 2/0247* (2013.01); *H01M 2/168* (2013.01); *H01M 2/1653* (2013.01); *H01M 2/0285* (2013.01); *H01M 10/0525* (2013.01)

(58) Field of Classification Search
CPC ............ H01M 2/1686; H01M 2/0247; H01M 2/1653; H01M 2/168; H01M 2/0285; H01M 10/0525
See application file for complete search history.

(56) References Cited

U.S. PATENT DOCUMENTS

| | | | |
|---|---|---|---|
| 5,922,493 A * | 7/1999 | Humphrey, Jr. | .... H01M 2/0275 429/175 |
| 6,225,010 B1 * | 5/2001 | Hamano et al. | ............. 429/306 |
| 6,692,873 B1 * | 2/2004 | Park et al. | .................... 429/247 |
| 2001/0009736 A1 * | 7/2001 | Shiota et al. | ................. 429/164 |
| 2002/0197413 A1 * | 12/2002 | Daido | .................. H01M 2/145 427/430.1 |
| 2004/0053122 A1 | 3/2004 | Sugiyama et al. | |
| 2006/0088762 A1 | 4/2006 | Okamoto | |
| 2006/0286446 A1 * | 12/2006 | Chun | ...................... B32B 27/12 429/142 |
| 2009/0186274 A1 * | 7/2009 | Wakita | ................. H01M 4/133 429/217 |

FOREIGN PATENT DOCUMENTS

| | | | |
|---|---|---|---|
| CN | 1495936 A | | 5/2004 |
| CN | 101494302 A | | 7/2009 |
| JP | 2001-76758 A | | 3/2001 |
| JP | 2001-319693 A | | 11/2001 |
| JP | 2002025620 A | * | 1/2002 |
| JP | 2003-7280 A | | 1/2003 |
| JP | 2003-178804 A | | 6/2003 |
| JP | 2004-111160 A | | 4/2004 |
| JP | 2006-120462 A | | 5/2006 |
| JP | 4109522 B2 | | 7/2008 |
| JP | 4127989 B2 | | 7/2008 |
| JP | 4414165 B2 | | 2/2010 |
| JP | 4490055 B2 | | 6/2010 |
| JP | 2012221741 A | * | 11/2012 |

OTHER PUBLICATIONS

International Search Report of PCT/JP2012/077131 dated Jan. 15, 2013.
Communication dated Sep. 30, 2015 from the State Intellectual Property Office of the P.R.C. in counterpart application No. 201280051180.5.

* cited by examiner

*Primary Examiner* — Gregg Cantelmo
(74) *Attorney, Agent, or Firm* — Sughrue Mion, PLLC

(57) ABSTRACT

A separator for a non-aqueous secondary battery including a porous substrate, and an adhesive porous layer that is formed on one side or both sides of the porous substrate and contains the following resin A and the following resin B. Resin A: a polyvinylidene fluoride resin containing structural units derived from vinylidene fluoride (VDF) and structural units derived from hexafluoropropylene (HFP), a total content ratio of structural units derived from HFP in each of the VDF copolymers being from 0.5 mol % to 1.5 mol % of a total content of structural units in each of the VDF copolymers; and Resin B: a polyvinylidene fluoride resin containing structural units derived from VDF and structural units derived from HFP, a total content ratio of structural units derived from HFP in each of the VDF copolymers being greater than 1.5 mol % of a total content of structural units in each of the VDF copolymers.

7 Claims, No Drawings

SEPARATOR FOR A NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2012/077131 filed Oct. 19, 2012 (claiming priority based on Japanese Patent Application No. 2011-231833 filed Oct. 21, 2011), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, such as those represented by lithium ion secondary batteries, have been widely used as power supplies for portable electronic devices such as laptop computers, mobile phones, digital cameras, or camcorders.

In recent years, with the reduction in size and weight of portable electronic devices, reduction in weight of an outer casing of a non-aqueous electrolyte battery has been realized. As an outer casing material, a can made of aluminum has been developed in place of a can made of stainless steal, and further, a pack made of aluminum laminate film has been developed in place of a can made of metal.

However, since packs made of aluminum laminate film are soft, in a battery (a soft pack battery) using the pack as the outer casing, a space is easily formed between the electrode and separator, due to impact from the outside or expansion•shrinkage of the electrode accompanying charging and discharging, which may result in a reduction in cycle life.

In order to address the above problem, techniques for enhancing adhesion between an electrode and a separator have been proposed.

As one of such techniques, a separator that an adhesive porous layer made of a polyvinylidene fluoride resin is formed on a polyolefin microporous membrane has been known (see, for example, Patent Documents 1 to 4). When this separator is superposed on an electrode and heat-pressed, the separator may favorably adhere to the electrode via the adhesive porous layer, and thus, the cycle life of a battery may be improved.

Generally, in a process of producing a soft pack battery using a separator having the above adhesive porous layer, electrodes and a separator are stacked together and rolled up, to prepare a battery element. This process of preparing a battery element is similar to the process of preparing a conventional battery element in the process of producing a battery having a metal can outer casing. Thus, it is advantageous in that it is not necessary to greatly change the conventional process of preparing a battery element, in the case of applying a separator having the above adhesive porous layer to a soft pack battery.

In view of the background described above, a separator that an adhesive porous layer made of a polyvinylidene fluoride resin is formed on a polyolefin microporous membrane is suitable for a soft pack battery, and various technical proposals have been made, focusing on further improvement in performance.

For example, the separator disclosed in Patent Document 1 focuses on the porous structure and thickness of an adhesive porous layer, from the viewpoint of achieving both the adhesion to electrodes and ion permeability. In the separators disclosed in Patent Documents 2 to 4, an adhesive porous layer is formed by using two kinds of polyvinylidene fluoride resins in combination, from the viewpoint of adhesion to electrodes.

Patent Document 1: Japanese Patent No. 4127989
Patent Document 2: Japanese Patent No. 4490055
Patent Document 3: Japanese Patent No. 4109522
Patent Document 4: Japanese Patent No. 4414165

DISCLOSURE OF THE INVENTION

Problem to be Solved by the Invention

However, in the process for producing a battery, when the temperature or pressure for heat pressing is made higher for the purpose of enhancing the adhesion between the separator and electrodes, there has been a case in which the porous structure of the adhesive porous layer is destroyed. In this case, the separator after heat pressing has inferior ion permeability, which involves deterioration in battery performance.

Accordingly, a separator having high adhesion to electrodes even after heat pressing under mild conditions or pressing without heating has been required.

The invention has been made in view of the above circumstances.

Under the above circumstances, a separator for a non-aqueous secondary battery which has an adhesive porous layer with a favorable porous structure, and exhibits excellent adhesion to electrodes and excellent ion permeability even after adhesion to electrodes has been required.

Further, under the above circumstances, a non-aqueous secondary battery which exhibits excellent cycle characteristics and excellent load characteristics has been required.

Means for Solving the Problem

Specific means for addressing the above problems are as follows.

<1> A separator for a non-aqueous secondary battery including a porous substrate, and
an adhesive porous layer that is formed on one side or both sides of the porous substrate and contains the following polyvinylidene fluoride resin A and the following polyvinylidene fluoride resin B:

Polyvinylidene fluoride resin A: a polyvinylidene fluoride resin containing structural units derived from vinylidene fluoride and structural units derived from hexafluoropropylene, a total content ratio of structural units derived from hexafluoropropylene in each of the vinylidene fluoride copolymers being from 0.5 mol % to 1.5 mol % of a total content of structural units in each of the vinylidene fluoride copolymers; and Polyvinylidene fluoride resin B: a polyvinylidene fluoride resin containing structural units derived from vinylidene fluoride and structural units derived from hexafluoropropylene, a total content ratio of structural units derived from hexafluoropropylene in each of the vinylidene fluoride copolymers being greater than 1.5 mol % of a total content of structural units in each of the vinylidene fluoride copolymers.

<2> The separator for a non-aqueous secondary battery as described in the above <1>, wherein the adhesive porous layer has a porosity of from 30% to 60% and an average pore size of from 20 nm to 100 nm.

<3> The separator for a non-aqueous secondary battery as described in the above <1> or <2>, wherein a mass ratio of the polyvinylidene fluoride resin A and the polyvinylidene fluoride resin B (polyvinylidene fluoride resin A:polyvinylidene fluoride resin B) in the adhesive porous layer is from 15:85 to 85:15.

<4> The separator for a non-aqueous secondary battery as described in any one of the above <1> to <3>, wherein an amount per unit area of the adhesive porous layer at one side of the porous substrate is from 0.5 g/m² to 1.5 g/m².

<5> A non-aqueous secondary battery including a positive electrode, a negative electrode, and the separator for a non-aqueous secondary battery as described in any one of the above <1> to <4>, the separator being disposed between the positive electrode and the negative electrode, wherein, in the non-aqueous secondary battery, electromotive force is obtained by lithium doping/dedoping.

<6> The non-aqueous secondary battery as described in the above <5>, further comprising an outer casing made of aluminum laminate film, wherein the positive electrode, the negative electrode and the separator for a non-aqueous secondary battery are housed in the outer casing.

Effect of the Invention

According to the invention, a separator for a non-aqueous secondary battery which has an adhesive porous layer with a favorable porous structure, and exhibits excellent adhesion to electrodes and excellent ion permeability even after adhesion to electrodes may be provided.

Further, according to the invention, a non-aqueous secondary battery which exhibits excellent cycle characteristics and excellent load characteristics may be provided.

BEST MODE FOR CARRYING OUT THE INVENTION

Hereinafter, exemplary embodiments of the invention are explained. The following explanation and examples are illustrative of the invention and are not to be construed as limiting the scope of the invention.

In the specification, a numerical range expressed using "to" denotes a range including the numerical values in front of and behind "to" as a minimum value and a maximum value, respectively.

In the specification, the term "process" includes not only an independent process, but also a case which cannot be clearly distinguished from other process, as long as the predetermined action is achieved.

<Separator for a Non-Aqueous Secondary Battery>

The separator for a non-aqueous secondary battery (hereinafter also referred to as "separator") of the invention is provided with a porous substrate and an adhesive porous layer that is formed on one side or both sides of the porous substrate.

Further, the adhesive porous layer contains the following polyvinylidene fluoride resin A and the following polyvinylidene fluoride resin B.

Polyvinylidene Fluoride Resin A:

a polyvinylidene fluoride resin containing structural units derived from vinylidene fluoride and structural units derived from hexafluoropropylene, a total content ratio of structural units derived from hexafluoropropylene in each of the vinylidene fluoride copolymers being from 0.5 mol % to 1.5 mol % of a total content of structural units in each of the vinylidene fluoride copolymers.

Polyvinylidene Fluoride Resin B:

a polyvinylidene fluoride resin containing structural units derived from vinylidene fluoride and structural units derived from hexafluoropropylene, a total content ratio of structural units derived from hexafluoropropylene in each of the vinylidene fluoride copolymers being greater than 1.5 mol % of a total content of structural units in each of the vinylidene fluoride copolymers.

By including resin A and resin B, as compared with the case of not including one of resin A or resin B, the adhesive porous layer in the invention exhibits excellent adhesion to electrodes and excellent ion permeability even after adhesion to electrodes. The reason for this is guessed as follows.

Polyvinylidene fluoride resins (hereinafter also referred to as "VDF-HFP resins"), which contain vinylidene fluoride and hexafluoropropylene as the polymerization components, become easily to swell with an electrolyte, in a case in which the polymerization ratio of hexafluoropropylene increases. Therefore, it is also expected that the greater the polymerization ratio of hexafluoropropylene in a VDF-HFP resin that is a component of the adhesive porous layer is, the better is the adhesion between the adhesive porous layer and an electrode.

However, in a case in which an adhesive porous layer is formed using a VDF-HFP resin having a high polymerization ratio of hexafluoropropylene, the porosity is easily heightened and the pore size is easily increased. In a case in which the adhesive porous layer has a high porosity and a large pore size, in the surface of the adhesive porous layer, the area of the VDF-HFP resin portion at which the VDF-HFP resin bonds to an electrode is reduced, and, therefore, the VDF-HFP resin portions exist sparsely. Therefore, as the polymerization ratio of hexafluoropropylene of the VDF-HFP resin that is a component of the adhesive porous layer is increased, contrary to the above expectation, the adhesion between the adhesive porous layer and an electrode tends to be rather lowered. In addition, in a case where the adhesive porous layer has a high porosity and a large pore size, ion migration at the electrode interface becomes ununiform, which adversely affects cycle characteristics and load characteristics of a battery.

In other words, it can be said that the polymerization ratio of hexafluoropropylene of the VDF-HFP resin may be reduced, in order to obtain an adhesive porous layer having such a low porosity and a smaller pore size that the ion permeability is not inhibited. It is expected that, with such an adhesive porous layer, the uniformity in ion migration at the electrode interface is high, the adhesive porous layer does not adversely affects the cycle characteristics and load characteristics of a battery, and also, the adhesion to electrodes improves, considering the form of the surface morphology.

However, VDF-HFP resins having a low polymerization ratio of hexafluoropropylene have inferior swelling property with respect to an electrolyte, and thus it is difficult to obtain high adhesion to electrodes.

Conventionally, as a means to improve the adhesion between an electrode and a separator, a means of heightening the pressure and temperature of heat pressing has been used. However, as the temperature and pressure for heat pressing are heightened, the porous structure of the adhesive porous layer is more easily destroyed, and ion permeability after adhesion to an electrode is deteriorated. Thus, it has been difficult to obtain favorable battery characteristics.

Accordingly, the invention intends to obtain excellent battery characteristics as well as enhanced adhesion to electrodes, by using two kinds of VDF-HFP resins having different polymerization ratio of hexafluoropropylene in the adhesive porous layer.

Namely, by using resin B which has a relatively high polymerization ratio of hexafluoropropylene, the swelling property of the VDF-HFP resin with respect to an electrolyte is ensured. Further, by using polyvinylidene fluoride resin A which has a relatively low polymerization ratio of hexafluoropropylene, an adhesive porous layer having such a low porosity and a small pore size that the ion permeability is not inhibited is realized. As a result, the uniformity in ion migration at the electrode interface is heightened, and a surface morphology suitable for adhesion to electrodes is obtained.

Therefore, when both the resin A and the resin B are applied to the adhesive porous layer, a synergistic effect on adhesion to electrodes is generated, so that the adhesive property is significantly improved, and excellent cycle characteristics and load characteristics of a battery are realized. Further, by using the resin A and the resin B in combination, the adhesion between the porous substrate and the adhesive porous layer is also improved, and a peeling force between layers is increased.

In the invention, as the VDF-HFP resin that constitutes the adhesive porous layer, resin A having a polymerization ratio of hexafluoropropylene of from 0.5 mol % to 1.5 mol % and resin B having a polymerization ratio of hexafluoropropylene of greater than 1.5 mol % are used in combination.

In a case in which one kind or two or more kinds of either one of the resin A or the resin B are used as the VDF-HFP resin that constitutes the adhesive porous layer, it is difficult to obtain high adhesion to electrodes, from the reason described above.

Further, in the case of using either one of the resin A or the resin B, and a VDF-HFP resin having a polymerization ratio of hexafluoropropylene of less than 0.5 mol % or a homopolymer of vinylidene fluoride (a polyvinylidene fluoride resin) in combination, since these resins have high crystallinity, the coating liquid for forming an adhesive porous layer is easily gelled, it is difficult to ensure suitable fluidity, and therefore, it is sometimes difficult to form a porous structure. Particularly, in the case of using a polyvinylidene fluoride resin, this phenomenon is prone to appear.

Moreover, the separator of the invention have excellent ion migration at the interface between the porous substrate and the adhesive porous layer.

Conventionally, in separators having an adhesive porous layer placed on a porous substrate, clogging easily occurs at the interface between the adhesive porous layer and the porous substrate, ion migration at the interface is deteriorated and thus, it is sometimes difficult to realize favorable battery characteristics. In contrast, the adhesive porous layer in the invention has a fine porous structure developed, and thus the uniformity of the pore distribution is high and the number of pores is large. Therefore, the possibility that the pores of the porous substrate and the pores of the adhesive porous layer are favorably connected increases, whereby the lowering of battery performance due to clogging is suppressed.

Hereinafter, component of the separator of the invention is described.

[Porous Substrate]

A porous substrate in the invention means a substrate having pores or voids inside. Examples of such a substrate include a microporous membrane, a porous sheet formed from a fibrous material, such as nonwoven fabric or a paper-like sheet, and a composite porous sheet obtained by placing one or more other porous layers on the microporous membrane or porous sheet. Note that, a microporous membrane means a membrane having a large number of micropores inside, in which the micropores are connected to allow gas or liquid to pass therethrough from one side to the other side of the membrane.

The material that forms the porous substrate may be either an organic material or an inorganic material as far as the material has an electrical insulating property. From the viewpoint of imparting a shutdown function to the porous substrate, the material that forms the porous substrate is preferably a thermoplastic resin. Here, the term "shutdown function" refers to the following function. Namely, in a case in which the battery temperature becomes high, the constituent material melts and blocks the pores of the porous substrate, thereby blocking the ion migration to prevent thermal runaway of the battery. As the thermoplastic resin, a thermoplastic resin having a melting point of lower than 200° C. is suitable, and polyolefin is particularly preferable.

As the porous substrate using polyolefin, a polyolefin microporous membrane is preferable.

As the polyolefin microporous membrane, a polyolefin microporous membrane that has sufficient dynamic physical properties and ion permeability can be selected, among the polyolefin microporous membranes that have been applied to conventional separators for a non-aqueous secondary battery.

From the viewpoint of exhibiting the shutdown function, it is preferable that the polyolefin microporous membrane contains polyethylene, and it is preferable that the content of polyethylene is 95% by mass or more.

In addition to the above, from the viewpoint of imparting heat resistance to such a degree that the membrane does not easily break when exposed to high temperatures, a polyolefin microporous membrane containing polyethylene and polypropylene is preferable. An example of such a polyolefin microporous membrane is a microporous membrane in which polyethylene and polypropylene are present as a mixture in one layer. In such a microporous membrane, it is preferable that the microporous membrane contains polyethylene in an amount of 95% by mass or more and polypropylene in an amount of 5% by mass or less, from the viewpoint of achieving both the shutdown function and heat resistance. Further, from the viewpoint of achieving both the shutdown function and heat resistance, it is also preferable that the polyolefin microporous membrane is a polyolefin microporous membrane having a multi-layer structure of two or more layers, in which at least one layer contains polyethylene and at least one layer contains polypropylene.

It is preferable that the polyolefin contained in the polyolefin microporous membrane has a weight average molecular weight of from 100,000 to 5,000,000. When the weight average molecular weight is 100,000 or more, sufficient dynamic physical properties can be ensured. Meanwhile, when the weight average molecular weight is 5,000,000 or less, the shutdown characteristics are favorable, and it is easy to form a membrane.

The polyolefin microporous membrane can be produced, for example, by the following method. Namely, an example of the method of forming a microporous membrane is a method including: extruding a molten polyolefin resin through a T-die to form a sheet, subjecting this sheet to a crystallization treatment, stretching the sheet, and subjecting the sheet that has been stretched to a heat treatment. Further, other examples of the method of forming a microporous membrane include a method including: melting a polyolefin resin together with a plasticizer such as liquid paraffin or the like, and extruding the melt through a T-die, followed by cooling, to form a sheet, stretching this sheet, extracting the plasticizer from the sheet that has been stretched, and subjecting the resulting sheet to a heat treatment.

Examples of a porous sheet formed from a fibrous material include a porous sheet formed from a fibrous material such as polyester such as polyethylene terephthalate; polyolefin such as polyethylene or polypropylene; or a heat resistant polymer such as aromatic polyamide, polyimide, polyethersulfone, polysulfone, polyetherketone, or polyetherimide; and a porous sheet formed from any mixture of the above fibrous materials.

A composite porous sheet may have a configuration in which a functional layer is disposed on a microporous membrane or a porous sheet formed from a fibrous material. Such a composite porous sheet is preferable, since a further function can be imparted by the functional layer. As the functional layer, for example, from the viewpoint of imparting heat resistance, a porous layer formed from a heat resistant resin or a porous layer formed from a heat resistant resin and an inorganic filler can be adopted. Examples of the heat resistant resin include one or two or more kinds of heat resistant polymers selected from the group consisting of aromatic polyamide, polyimide, polyethersulfone, polysulfone, polyetherketone, and polyetherimide. As the inorganic filler, a metal oxide such as alumina, a metal hydroxide such as magnesium hydroxide, or the like can be used suitably.

Examples of a method of forming a composite include a method of coating a functional layer on a microporous membrane or a porous sheet, a method of joining a functional layer and a microporous membrane or a porous sheet using an adhesive, and a method of compression bonding or thermocompression bonding of a functional layer and a microporous membrane or a porous sheet.

In the invention, the thickness of the porous substrate is preferably in a range of from 5 µm to 25 µm, from the viewpoint of obtaining favorable dynamic physical properties and internal resistance.

The Gurley value (JIS P8117) of the porous substrate is preferably in a range of from 50 sec/100 cc to 800 sec/100 cc, from the viewpoints of preventing a short circuit in the battery and obtaining sufficient ion permeability.

The puncture strength of the porous substrate is preferably 300 g or more, from the viewpoint of improving the production yield.

[Adhesive Porous Layer]

The adhesive porous layer according to the invention means a layer that has a large number of micropores inside, in which these micropores are connected to allow gas or liquid to pass therethrough from one side to the other side.

Further, in the invention, the adhesive porous layer is a layer that is provided on one side or both sides of the porous substrate, as the outermost layer of a separator, and can bond to an electrode.

It is more preferable that the adhesive porous layer is formed on both sides of the porous substrate than only on one side of the porous substrate, from the viewpoint of having excellent cycle characteristics of a battery. It is because, when the adhesive porous layer exists on both sides of the porous substrate, the two surfaces of the separator adhere well to the two electrodes, respectively, via the adhesive porous layer.

In the invention, the average thickness of the adhesive porous layer is preferably from 0.5 µm to 5 µm on one side of the porous substrate, from the viewpoint of ensuring adhesion to electrodes and a high energy density.

In the invention, it is preferable that the adhesive porous layer has a porosity of from 30% to 60% and an average pore size of from 20 nm to 100 nm. The porosity and the average pore size respectively being within the above ranges is advantageous in that the ion permeability is excellent, the uniformity of ion migration at the electrode interface is high, and the surface morphology is suitable for adhesion to electrodes. The details are as follows.

When the porosity of the adhesive porous layer is 30% or more, the ion permeability is favorable.

When the porosity of the adhesive porous layer is 60% or less, the rate of hole area on the surface is not too high, and thus the adhesion to electrodes is more excellent. In addition, when the porosity is 60% or less, a mechanical strength enough to withstand the pressing process for adhesion to electrodes can be ensured.

When the average pore size of the adhesive porous layer is 20 nm or more, even if the polyvinylidene fluoride resin, that constitutes the adhesive porous layer, swells when impregnated with an electrolyte, the pores are less likely to be blocked, and thus, the ion permeability is less likely to be inhibited.

When the average pore size of the adhesive porous layer is 100 nm or less, in the surface of the adhesive porous layer, the ununiformity of holes is suppressed, adhesion points are uniformly dispersed, as a result of which, the adhesion to electrodes is more excellent. In addition, when the average pore size is 100 nm or less, ion migration at the electrode interface easily becomes uniform, whereby the cycle characteristics and load characteristics of a battery are further improved.

In the invention, the average pore size of the adhesive porous layer is calculated according to the following equation, assuming that all pores are cylindrical.

$$d = 4 \cdot V/S$$

Here, d represents the average pore size (diameter) (nm) of the adhesive porous layer, V represents the pore volume per 1 $m^2$ of the adhesive porous layer, and S represents the pore surface area per 1 $m^2$ of the adhesive porous layer.

The pore volume V per 1 $m^2$ of the adhesive porous layer is calculated from the porosity of the adhesive porous layer.

The pore surface area S per 1 $m^2$ of the adhesive porous layer is determined by the following method.

First, the specific surface area ($m^2/g$) of the porous substrate and the specific surface area ($m^2/g$) of the separator are calculated from the nitrogen gas amount absorbed, by applying the BET equation to a nitrogen gas adsorption method. These specific surface areas ($m^2/g$) are each multiplied by the respective weights per unit area ($g/m^2$) to determine the pore surface areas per 1 $m^2$. Then, the pore surface area per 1 $m^2$ of the porous substrate is subtracted from the pore surface area per 1 $m^2$ of the separator to determine the pore surface area S per 1 $m^2$ of the adhesive porous layer.

From the viewpoints of adhesion to electrodes and ion permeability, the coating amount of the adhesive porous layer in the invention is preferably from 0.5 $g/m^2$ to 1.5 $g/m^2$ on one side of the porous substrate. When the coating amount is 0.5 $g/m^2$ or more, the adhesion to electrodes is more excellent. Meanwhile, when the coating amount is 1.5 g/m² or less, the ion permeability is more excellent, as a result of which, the load characteristics of a battery is more excellent.

In a case in which the adhesive porous layer is provided on both sides of the porous substrate, it is preferable that the coating amount of the adhesive porous layer, as the total on both sides, is from 1.0 g/m² to 3.0 g/m².

In the invention, in a case in which the adhesive porous layer is provided on both sides of the porous substrate, it is preferable that the difference between the coating amount on one side and the coating amount on the other side is 20% or less, relative to the total coating amount on both sides. When the difference is 20% or less, the separator is hardly curled, and as a result, handling property is favorable, and the problem of deterioration in cycle characteristics is less likely to occur.

The adhesive porous layer may contain a filler formed from an inorganic substance or an organic substance, or other components. By the inclusion of a filler, slipping property or heat resistance of the separator can be improved. Examples of an inorganic filler include metal oxides such as alumina, and metal hydroxides such as magnesium hydroxide. Examples of an organic filler include acrylic resins.

[Polyvinylidene Fluoride Resin]

In the invention, the adhesive porous layer contains the following polyvinylidene fluoride resin A and the following polyvinylidene fluoride resin B.

Polyvinylidene fluoride resin A: a polyvinylidene fluoride resin containing structural units derived from vinylidene fluoride and structural units derived from hexafluoropropylene, a total content ratio of structural units derived from hexafluoropropylene in each of the vinylidene fluoride copolymers being from 0.5 mol % to 1.5 mol % of a total content of structural units in each of the vinylidene fluoride copolymers Polyvinylidene fluoride resin B: a polyvinylidene fluoride resin containing structural units derived from vinylidene fluoride and structural units derived from hexafluoropropylene, a total content ratio of structural units derived from hexafluoropropylene in each of the vinylidene fluoride copolymers being greater than 1.5 mol % of a total content of structural units in each of the vinylidene fluoride copolymers In the resin A, it is preferable that the ratio of structural units derived from hexafluoropropylene to all structural units is from 0.5 mol % to 1.0 mol %. When the ratio of structural units derived from hexafluoropropylene is within this range, a fine porous structure is easily developed, and the cycle characteristics and load characteristics of a battery may be more excellent.

In the resin B, the upper limit of the ratio of structural units derived from hexafluoropropylene to all structural units is preferably less than 50 mol %, more preferably 15 mol % or less, and still more preferably 10 mol % or less. When the ratio of structural units derived from hexafluoropropylene is within this range, the porosity and the average pore size never become too large.

The resin A and the resin B may contain an additional monomer other than vinylidene fluoride or hexafluoropropylene, as a copolymerization component. Examples of the additional monomer include tetrafluoroethylene, trifluoroethylene, trichloroethylene, and vinyl fluoride. One kind of the additional monomers may be contained, or two or more kinds of them may be contained.

However, it is preferable that the resin A and the resin B are each a copolymer consisting of only vinylidene fluoride and hexafluoropropylene.

It is preferable that the resin A and the resin B each have a weight average molecular weight of from 200,000 to 3,000,000. When the weight average molecular weight is 200,000 or more, the adhesive porous layer can ensure dynamic physical properties enough to withstand the treatment (for example, heat pressing) for adhesion to electrodes, and a sufficient adhesive property can be attained. Meanwhile, when the weight average molecular weight is 3,000,000 or less, the viscosity of the coating liquid at the time of formation by coating does not become too high, and thus, excellent formability is realized. The weight average molecular weight is more preferably in a range of from 300,000 to 2,000,000, and still more preferably in a range of from 400,000 to 1,500,000.

Examples of a method for producing resin A and resin B include emulsion polymerization and suspension polymerization. Above all, the resin A and resin B that have a relatively high molecular weight are preferably synthesized by emulsion polymerization or suspension polymerization, and are more preferably synthesized by suspension polymerization. Further, it is possible to select a commercially available resin that satisfies the copolymerization ratio of resin A or resin B.

It is preferable that the mass ratio (resin A:resin B) of resin A and resin B, which are contained in the adhesive porous layer, is from 15:85 to 85:15. That is, it is preferable that the percentage of resin A in the total amount of resin A and resin B is from 15% by mass to 85% by mass (the percentage of resin B is from 15% by mass to 85% by mass).

When the percentage of resin A is 15% by mass or more, the surface morphology of the adhesive porous layer easily becomes a form suitable for adhesion to electrodes. In addition, when the percentage of resin A is 15% by mass or more, a fine porous structure is easily developed, and the cycle characteristics and load characteristics of a battery is more excellent.

When the percentage of resin B is 15% by mass or more, the swelling property of the adhesive porous layer with respect to an electrolyte is easily ensured.

The mass ratio (resin A:resin B) of resin A and resin B, which are contained in the adhesive porous layer, is more preferably from 25:75 to 75:25, and still more preferably from 35:65 to 65:35.

The adhesive porous layer may contain an additional resin other than the resin A or the resin B. Examples of the additional resin include homopolymers of vinylidene fluoride (namely, polyvinylidene fluoride); copolymers (polyvinylidene fluoride copolymers) consisting of vinylidene fluoride and other monomer capable of copolymerization (tetrafluoroethylene, trifluoroethylene, trichloroethylene, vinyl fluoride, or the like); styrene-butadiene copolymers; homopolymers or copolymers of a vinylnitrile such as acrylonitrile or methacrylonitrile; polyethers such as polyethylene oxide or polypropylene oxide; and the like.

[Physical Properties of Separator]

From the viewpoints of mechanical strength and the energy density when prepared as a battery, the film thickness of the whole separator of the invention is preferably from 5 nm to 35 μm, and more preferably from 10 μm to 20 μm.

From the viewpoints of adhesion to electrodes, mechanical strength, and ion permeability, it is preferable that the porosity of the separator of the invention is from 30% to 60%.

From the viewpoint of achieving favorable balance between mechanical strength and membrane resistance, it is preferable that the Gurley value (JIS P8117) of the separator of the invention is from 50 sec/100 cc to 800 sec/100 cc.

In the separator of the invention, from the viewpoint of ion permeability, the difference between the Gurley value of the porous substrate and the Gurley value of the separator including an adhesive porous layer formed on the porous substrate is preferably 300 sec/100 cc or less, more preferably 150 sec/100 cc or less, and still more preferably 100 sec/100 cc or less.

From the viewpoint of load characteristics of a battery, it is preferable that the membrane resistance of the separator of the invention is from 1 ohm·cm$^2$ to 10 ohm·cm$^2$. The term "membrane resistance" used herein refers to the resistance value of a separator when the separator is impregnated with an electrolyte, and is measured by an alternating current method. Naturally, the value varies depending on the kind of electrolyte, or the temperature, and the above numerical value is a numerical value measured at 20° C., using 1 M LiBF$_4$-propylene carbonate/ethylene carbonate (mass ratio of 1/1) as the electrolyte.

It is preferable that the thermal shrinkage percentage of the separator of the invention at 105° C. is 10% or less in both MD direction and TD direction. When the thermal shrinkage percentage is within this range, the shape stability and shut down characteristics of the separator are well balanced. The thermal shrinkage percentage is more preferably 5% or less.

[Method for Producing Separator for a Non-Aqueous Secondary Battery]

The separator of the invention can be produced, for example, by a method in which a coating liquid containing the resin A and the resin B is coated on a porous substrate to form a coated layer, and subsequently, the polyvinylidene fluoride resin in the coated layer is solidified to integrally form an adhesive porous layer on the porous substrate.

An adhesive porous layer formed from a polyvinylidene fluoride resin can be formed, for example, by the following wet coating method.

First, a polyvinylidene fluoride resin is dissolved in a solvent to prepare a coating liquid. This coating liquid is coated on a porous substrate, followed by immersion in an appropriate coagulation liquid. Thereby, the polyvinylidene fluoride resin is solidified, while inducing phase separation. Through this process, a layer, which has a porous structure and is formed from a polyvinylidene fluoride resin, is formed on the porous substrate. Thereafter, the porous substrate is washed with water, followed by drying, to remove the coagulation liquid from the layer having a porous structure.

Details of the wet coating method suitable for the invention are as follows.

As the solvent which is used for the preparation of the coating liquid and dissolves the polyvinylidene fluoride resin (hereinafter also referred to as "good solvent"), a polar amide solvent such as N-methyl-2-pyrrolidone (NMP), dimethylacetamide (DMAc), dimethylformamide, or dimethylformamide can be used suitably.

From the viewpoint of forming a favorable porous structure, it is preferable to mix a poor solvent, which functions as a phase separation agent that induces phase separation, with a good solvent. Examples of the poor solvent include water, methanol, ethanol, propyl alcohol, butyl alcohol, butanediol, ethylene glycol, propylene glycol, and tripropylene glycol (TPG). It is preferable that the poor solvent is added within a range where viscosity suitable for coating can be ensured.

From the viewpoint of forming a favorable porous structure, it is preferable that the solvent is a mixed solvent containing a good solvent in an amount of 60% by mass or more and a poor solvent in an amount of from 5% by mass to 40% by mass.

Conventionally, as the coating liquid for forming an adhesive porous layer, a coating liquid obtained by dissolving a polyvinylidene fluoride resin in a mixed solvent including a good solvent such as DMAc or NMP and a poor solvent such as water or TPG has been used (see, for example, Patent Documents 1 to 4).

However, although it depends on the environmental conditions after preparation, the coating liquid including a poor solvent is prone to be gelled, and in the case of being gelled, an adhesive porous layer having a fine porous structure developed cannot be formed, or streaks may occur on the surface of the adhesive porous layer. Since the porous structure and surface morphology of the adhesive porous layer have influence on the adhesion to electrodes and battery characteristics, the coating liquid is required to have storage stability.

In the invention, resin A and resin B are included in the coating liquid for forming an adhesive porous layer. Accordingly, although detailed mechanism is not clear, the storage stability of the coating liquid is high, and gelation hardly occurs. Therefore, even if a coating liquid not immediately after preparation is used, a fine porous structure is developed, an adhesive porous layer having favorable surface morphology is formed, and the cycle characteristics and load characteristics of a battery are excellent.

From the viewpoint of forming a favorable porous structure, it is preferable that the coating liquid contains the polyvinylidene fluoride resin with a concentration of from 3% by mass to 10% by mass.

In a case in which a filler or other component is added into the adhesive porous layer, the filler or other component may be dispersed or dissolved in the coating liquid.

In general, the coagulation liquid includes a good solvent and a poor solvent, which are used for the preparation of the coating liquid, and water. It is preferable that the mixing ratio of the good solvent and the poor solvent is determined according to the mixing ratio of the mixed solvent used for dissolving the polyvinylidene fluoride resin, in view of productivity. The concentration of water is preferably from 40% by mass to 90% by mass, from the viewpoints of formation of a porous structure and productivity.

With regard to the coating of the coating liquid on a porous substrate, a conventional coating system such as a Mayer bar, a die coater, a reverse roll coater, or a gravure coater may be applied. In a case in which the adhesive porous layer is formed on both sides of the porous substrate, it is preferable that the coating liquid is coated simultaneously on both sides of the substrate, from the viewpoint of productivity.

Other than the wet coating method described above, the adhesive porous layer can be produced by a dry coating method. Here, the "dry coating method" refers to a method in which a coating liquid containing a polyvinylidene fluoride resin and a solvent is coated on a porous substrate, followed by drying the resulting coated layer to volatilize and remove the solvent, thereby obtaining a porous layer. However, in a dry coating method, as compared with a wet coating method, the coated layer easily becomes dense. Thus, in view of obtaining a favorable porous structure, it is preferable to use a wet coating method.

The separator of the invention can also be produced by a method in which an adhesive porous layer is produced as an independent sheet, then this adhesive porous layer is superposed on a porous substrate, and then the resulting assembly is conjugated by thermocompression bonding or an adhesive. An example of a method of producing an adhesive porous layer as an independent sheet is a method in which a coating liquid containing a polyvinylidene fluoride resin is coated on a release sheet, followed by forming an adhesive porous layer by applying the wet coating method or dry coating method described above, and then the adhesive porous layer is peeled off from the release sheet.

<Non-Aqueous Electrolyte Battery>

The non-aqueous electrolyte battery of the invention is a non-aqueous electrolyte battery that obtains electromotive force by doping/dedoping of lithium, and includes a positive electrode, a negative electrode, and the separator for a non-aqueous secondary battery of the invention described above. Non-aqueous electrolyte batteries have the following structure. Namely, a battery element, in which a structural body including a negative electrode and a positive electrode which face each other via a separator is impregnated with an electrolyte, is enclosed in an outer casing material.

The non-aqueous electrolyte battery of the invention is suitable as a non-aqueous electrolyte secondary battery, especially, a lithium ion secondary battery.

Note that, the term "dope" means occlusion, support, adsorption, or insertion, and means a phenomenon in which a lithium ion enters into an active material of an electrode such as a positive electrode or the like.

By including, as a separator, the separator for a non-aqueous secondary battery of the invention described above, the non-aqueous electrolyte battery of the invention exhibits excellent adhesion between the electrode and the separator, resulting in having excellent cycle characteristics.

Further, by including, as a separator, the separator for a non-aqueous secondary battery of the invention described above, the non-aqueous electrolyte battery of the invention exhibits excellent ion permeability, resulting in having excellent load characteristics.

The positive electrode may have a structure in which an active substance layer including a positive electrode active substance and a binder resin is formed on a current collector. The active substance layer may further include an electrically conductive additive.

Examples of the positive electrode active substance include lithium-containing transition metal oxides. Specific examples include $LiCoO_2$, $LiNiO_2$, $LiMm_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include polyvinylidene fluoride resins.

Examples of the electrically conductive additive include carbon materials such as acetylene black, KETJENBLACK, or graphite powder.

Examples of the current collector include an aluminum foil, a titanium foil, and a stainless steel foil, each having a thickness of from 5 μm to 20 μm.

In the non-aqueous electrolyte battery of the invention, in a case in which the adhesive porous layer of the separator is placed on the positive electrode side, since the polyvinylidene fluoride resin has excellent oxidation resistance, a positive electrode active substance which can be operated at a high voltage of 4.2 V or more, such as $LiMm_{1/2}Ni_{1/2}O_2$ or $LiCo_{1/3}Mn_{1/3}Ni_{1/3}O_2$, can be easily applied, which is thus advantageous.

The negative electrode may have a structure in which an active substance layer, that includes a negative electrode active substance and a binder resin, is formed on a current collector. The active substance layer may further contain an electrically conductive additive.

Examples of the negative electrode active substance include materials capable of electrochemically occluding lithium. Specific examples include carbon materials; alloys of lithium and silicon, tin, aluminium, or the like; and the like.

Examples of the binder resin include polyvinylidene fluoride resins and styrene-butadiene rubbers. Even in the case of using a styrene-butadiene rubber as the negative electrode binder, the separator of the invention can ensure sufficient adhesion to the negative electrode.

Examples of the electrically conductive additive include carbon materials such as acetylene black, KETJENBLACK, or graphite powder.

Examples of the current collector include a copper foil, a nickel foil, and a stainless steel foil, each having a thickness of from 5 μm to 20 μm.

Further, instead of using the negative electrode described above, it is possible to use a metal lithium foil as the negative electrode.

In the electrode, it is preferable that the active substance layer contains a large amount of binder resin, from the viewpoint of adhesion to a separator. Meanwhile, from the viewpoint of increasing the energy density of a battery, it is preferable that the active substance layer contains a large amount of active substance, and it is preferable that the amount of binder resin is relatively small.

Since the separator of the invention has excellent adhesion to electrodes, it is possible to reduce the amount of binder resin that constitutes the active substance layer of the electrode and to increase the amount of active substance, so that the energy density of a battery can be increased.

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and the like. These non-aqueous solvents may be used singly or in mixture.

As the electrolyte, a solution obtained by mixing cyclic carbonate and chain carbonate at a mass ratio (cyclic carbonate/chain carbonate) of from 20/80 to 40/60, and dissolving a lithium salt to give a concentration of from 0.5 M to 1.5 M in the resulting solvent is preferable.

In a separator including a conventional adhesive porous layer, there are cases in which adhesion to electrodes is hardly exhibited depending on the kind of electrolyte used. However, in the separator of the invention, favorable adhesive property can be exhibited, regardless of the kind of electrolyte, which is thus advantageous.

Examples of the outer casing material include a metal can and a pack made of aluminum laminate film. Examples of the shape of a battery include a square type, a cylindrical type, and a coin type. The separator of the invention is suitable for any shape.

Since the separator of the invention has excellent adhesion to electrodes, a space is hardly formed between the electrode and the separator, even if impact from the outside is applied or expansion and shrinkage of the electrode occurs accompanying charging and discharging. Thus, the separator of the invention is suitable for use in a soft pack battery having a pack made of aluminum laminate film as the outer casing material. Accordingly, according to the separator of the invention, a soft pack battery having high battery performance can be provided.

The non-aqueous electrolyte battery of the invention can be produced, for example, by the following method. Namely, the separator of the invention is disposed between a positive electrode and a negative electrode to prepare a laminated body. Then, this laminated body is impregnated with an electrolyte and housed in an outer casing material (for example, a pack made of aluminum laminate film). Then, the laminated body is pressed together with the outer casing material, whereby a non-aqueous secondary battery is obtained.

By the production method described above, the electrodes and the separator can be favorably adhered to each other, and thus a non-aqueous electrolyte battery having an excellent cycle life may be obtained. In addition, because of the favorable adhesion between the electrodes and the separator, the battery also has excellent safety.

The separator of the invention can bond to electrodes by stacking the separator and the electrodes together. Therefore, in the production of a battery, the pressing described above is not an essential process. However, in order to enhance the adhesion between the electrodes and the separator, it is preferable to perform pressing. In order to further enhance the adhesion between the electrodes and the separator, it is preferable to perform pressing (heat pressing) while heating.

A system of disposing a separator between a positive electrode and a negative electrode may be a system (a so-called stack system) of layering a positive electrode, a separator, and a negative electrode, each by at least one layer, in this order, and may be a system in which a positive electrode, a separator, a negative electrode, and a separator are piled up in this order and rolled up in the direction of the length.

EXAMPLES

Hereinafter, the invention will be more specifically described with reference to examples. The material, the amount of use, the ratios, the processing order, and the like described in the following examples can be changed as appropriate as long as not departing from the spirit of the invention. Accordingly, it should be understand that the scope of the invention is not to be limited to the specific examples shown below.

<Measuring Methods>

The measuring methods applied to the Examples and Comparative Examples in the invention are as follows.

[Composition of Polyvinylidene Fluoride Resin]

The composition of polyvinylidene fluoride resin was determined from NMR spectrum. Specifically, 20 mg of polyvinylidene fluoride resin was dissolved in 0.6 mL of deuterated dimethyl sulfoxide at 100° C., and $^{19}$F-NMR spectrum was measured at 100° C.

[Film Thickness]

The thickness (μm) of the separator was determined by measuring arbitrary selected 20 points in 10 cm×10 cm, using a contact thickness meter (LITEMATIC, manufactured by Mitutoyo Corporation), and arithmetically averaging the measured values. The measurement was performed using a cylindrical measuring terminal having a diameter of 5 mm, with adjustment so that a load of 7 g was applied during the measurement.

[Weight Per Unit Area]

Samples were cut into a 10 cm×10 cm piece, and the mass of the piece was measured. The obtained mass was divided by the area to determine the weight per unit area.

[Weight of Polyvinylidene Fluoride Resin]

With regard to each surface of the separator, the weight (g/m$^2$) of polyvinylidene fluoride resin was determined from the intensity of the FKα spectrum, using an energy dispersion fluorescent X-ray analyzer (EDX-800HS, manufactured by Shimadzu Corporation). Further, the weights of the respective surfaces were summed. Moreover, the difference of weight between the two surfaces (=|weight on one side−weight on the other side|/total weight on both sides× 100[%]) was calculated.

[Porosity]

The porosities of the separator were determined from the following Equation.

$$\varepsilon = \{1 - Ws/(ds \cdot t)\} \times 100$$

Here, ε represents the porosity (%), Ws represents the weight per unit area (g/m$^2$), ds represents the true density (g/cm$^3$), and t represents the film thickness (μm).

The porosity ε (%) of a separator in which a polyethylene porous substrate and a porous layer formed only from a polyvinylidene fluoride resin are layered was calculated according to the following Equation.

$$\varepsilon = \{1 - (Wa/0.95 + Wb/1.78)/t)\} \times 100 \qquad \text{(Equation 4)}$$

Here, Wa represents the weight per unit area (g/m$^2$) of the polyethylene porous substrate, Wb represents the weight (g/m$^2$) of the polyvinylidene fluoride resin, and t represents the film thickness (μm) of a separator.

Note that, the porosity of an adhesive porous layer formed from a polyvinylidene fluoride resin was calculated according to the above equation, taking Wa as 0 (g/m$^2$), and t as the thickness of the adhesive porous layer (namely, a value obtained by subtracting the film thickness of the porous substrate from the film thickness of the separator).

[Average Pore Size of Adhesive Porous Layer]

The average pore size of the adhesive porous layer was calculated according to the following equation, assuming that all pores were cylindrical.

$$d = 4 \cdot V/S$$

Here, d represents the average pore size (diameter) (nm) of the adhesive porous layer, V represents the pore volume per 1 m$^2$ of the adhesive porous layer, and S represents the pore surface area per 1 m$^2$ of the adhesive porous layer.

The pore volume V per 1 m$^2$ of the adhesive porous layer was calculated from the porosity of the adhesive porous layer.

The pore surface area S per 1 m$^2$ of the adhesive porous layer was calculated by the following method.

By a gas adsorption method, applying the BET equation, the specific surface area (m$^2$/g) of the polyolefin microporous membrane and the specific surface area (m$^2$/g) of the separator, which an adhesive porous layer is layered on the a polyolefin microporous membrane, were measured. These specific surface areas (m$^2$/g) were multiplied by the respective weights per unit (g/m$^2$) to calculate the pore surface areas per 1 m$^2$ of sheet. Then, the pore surface area per 1 m$^2$ of the polyolefin microporous membrane was subtracted from the pore surface area per 1 m$^2$ of the separator, to calculate the pore surface area S per 1 m$^2$ of the adhesive porous layer.

[Gurley Value]

The Gurley value was measured in accordance with JIS P8117, using a Gurley densometer (G-B2C, manufactured by Toyo Seiki Co., Ltd.).

[Peel Force]

A tape (SCOTCH (registered trademark) MENDING TAPE 810, manufactured by 3M) was attached on both surfaces of the separator, and the separator was cut to a size of 10 mm×200 mm to obtain a test piece. In one of the edge portions in the longitudinal direction of this test piece, the edge portions of the tapes on both surfaces were each pealed off, and the edge portions of the two tapes that had been peeled off were held by a tensile tester (TENSILON UNIVERSAL TESTER RTC-1210A, manufactured by Orientec Co., Ltd.). Then, a peeling test was carried out under the following conditions. Namely, the tensile direction was the direction perpendicular to the surface of the test piece, and the tensile speed was 20 mm/min. The average of the stress values at 30 mm to 100 mm (the values obtained by continuously measuring during peeling from 30 mm to 100 mm from the initiation of tensile) was designated as the peel force (N/cm).

[Membrane Resistance]

The separator was impregnated with 1 M $LiBF_4$-propylene carbonate/ethylene carbonate (mass ratio 1/1) as the electrolyte, and was sandwiched between aluminum foil electrodes each having a lead tab attached, and then enclosed in an aluminum pack, to produce a test cell. The resistance (ohm·$cm^2$) of the obtained test cell was measured in accordance with an alternating current impedance method (measuring frequency 100 kHz) under 20° C.

[Adhesion to Electrode]

10 test batteries were disassembled, and the strength when peeling off the negative electrode from the separator and the strength when peeling off the positive electrode from the separator were measured using a tensile tester. The average value of strength respect to the negative electrode and the average value of strength respect to the positive electrode were each calculated. Further, the strength respect to the negative electrode and the strength respect to the positive electrode were averaged. The indices in Examples and Comparative Examples were calculated, taking the index of the strength in Example 1 as 100.

[Cycle Characteristic (Capacity Retention Ratio)]

With regard to 10 test batteries, charge and discharge were repeatedly carried out under 25° C. In this operation, the charge condition was constant-current constant-voltage charge at 1 C and 4.2 V, and the discharge condition was constant-current discharge at 1 C and 2.75 V cut-off. The value obtained by dividing the discharge capacity in the 100th cycle by the initial capacity was designated as the capacity retention ratio (%), and the average of 10 test batteries were calculated.

[Load Characteristic]

With regard to 10 test batteries, the discharge capacity when discharging at 0.2 C and a discharge capacity when discharging at 2 C were measured under the temperature of 25° C., and the value (%) obtained by dividing the latter by the former was used as an index of load characteristics. Here, the charge condition was constant-current constant-voltage charge at 0.2 C and 4.2 V for 8 hours, and the discharge condition was constant-current discharge at 2.75 V cut-off.

Note that, the above index of load characteristics is also the index of ion permeability of a separator after adhesion.

[Viscosity of Coating Liquid]

The coating liquid for forming an adhesive porous layer was placed in a bottle made of polyethylene, followed by putting a lid on it, and this bottle was left in a dark place for 24 hours under 20° C. The viscosities of the coating liquid before and after leaving were measured using a B-type viscometer, under the conditions of a measuring temperature of 20° C. and a shear rate of 2.64 $s^{-1}$. The ratio of the viscosity after leaving relative to the viscosity before leaving (viscosity after leaving/viscosity before leaving) was calculated.

[Occurrence of Streaks]

Using a three-wavelength neutral white fluorescent lamp (FPL27EX-N, manufactured by Panasonic Corporation) placed at a distance of 30 cm from one side (arbitrarily selected) of a separator (100 cm in length×40 cm in width) having an adhesive porous layer on both sides, the separator was irradiated with light, and over the entire region of the other surface, the size of streaks were visually measured. Streaks having a width of from 0.05 mm to 1 mm and a length of 1 cm or more were counted. Evaluation was performed according to the following criteria.

A: The number of streaks is 1 or less per 10 $m^2$.
B: The number of streaks is from 2 to 50 per 10 $m^2$.
C: The number of streaks is 51 or more per 10 $m^2$.

Note that, it is thought that streaks occur as follows. Namely, at the time of forming an adhesive porous layer using a coating liquid, when a foreign matter, such as an aggregate or an undissolved substance in the coating liquid or a solid that has permeated from the outside, adheres to the surface of the coated layer and is dragged along the surface, as a result of which, a streak occurs.

Example 1

[Production of Separator]

As polyvinylidene fluoride resin A, a vinylidene fluoride/hexafluoropropylene copolymer having a composition ratio (molar ratio) of 99.4/0.6 was prepared by suspension polymerization.

As polyvinylidene fluoride resin B, a vinylidene fluoride/hexafluoropropylene copolymer (weight average molecular weight of 470,000) having a composition ratio (molar ratio) of 95.2/4.8 was prepared.

A polyvinylidene fluoride resin obtained by mixing the polyvinylidene fluoride resin A and the polyvinylidene fluoride resin B at a mass ratio of 60/40 was dissolved in a mixed solvent of dimethylacetamide and tripropylene glycol (dimethylacetamide/tripropylene glycol=7/3 [mass ratio]) such that the concentration of resin was 5% by mass, to prepare a coating liquid for forming an adhesive porous layer.

Equal amounts of this coating liquid were coated respectively on both sides of a polyethylene microporous membrane (film thickness of 9 μm, Gurley value of 160 sec/100 cc, porosity of 38%), followed by immersion in a coagulation liquid (water/dimethylacetamide/tripropylene glycol=57/30/13 [mass ratio]) at 40° C., to perform solidification.

Subsequently, the resulting membrane was washed with water, followed by drying, to obtain a separator having an adhesive porous layer made of polyvinylidene fluoride resin formed on both sides of a polyethylene microporous membrane.

[Production of the Test Battery]

[Production of Negative Electrode]

300 g of artificial graphite, which is a negative electrode active substance, 7.5 g of a water-soluble dispersion including a modified product of a styrene-butadiene copolymer, which is a binder, in an amount of 40% by mass, 3 g of carboxymethylcellulose, which is a thickener, and an appropriate amount of water were stirred using a double-arm mixer, thereby obtaining a slurry for a negative electrode. This slurry for a negative electrode was coated on a copper foil having a thickness of 10 μm, which is a negative electrode current collector, and the resulting coated membrane was dried, followed by pressing, to produce a negative electrode having a negative electrode active substance layer.

[Production of Positive Electrode]

89.5 g of lithium cobalt oxide powder, which is a positive electrode active substance, 4.5 g of acetylene black, which is an electrically conductive additive, and polyvinylidene fluoride, which is a binder, were dissolved in NMP such that the amount of the polivinylidene fluoride was 6% by mass, and the obtained solution was stirred using a double-arm mixer such that the weight of the polyvinylidene fluoride was 6% by mass, thereby obtaining a slurry for a positive electrode. This slurry for a positive electrode was coated on an aluminum foil having a thickness of 20 μm, which is a positive electrode current collector, and the resulting coated membrane was dried, followed by pressing, to produce a positive electrode having a positive electrode active substance layer.

[Production of Battery]

To the positive electrode and the negative electrode, a lead tab was welded. Then, the positive electrode, the separator, and the negative electrode were layered one on another in this order to prepare a laminated body. The laminated body was impregnated with an electrolyte, and housed in a pack made of aluminum laminate film. Here, 1 M LiPF$_6$-ethylene carbonate/ethyl methyl carbonate (mass ratio of 3/7) was used as the electrolyte.

Further, this pack was pre-sealed using a vacuum sealer such that inside the pack was in a vacuum state. Then, the laminated body was heat-pressed together with the pack using a heat press machine, whereby adhesion between the electrodes and the separator, and sealing of the pack were carried out. The heat pressing was conducted under the conditions of a load of 20 kg per 1 cm$^2$ of electrode, a temperature of 90° C., and a pressing time of 2 minutes.

The physical properties and evaluation results of the separator and test battery of Example 1 are shown in Table 1 and Table 2.

Example 2

As polyvinylidene fluoride resin A, a vinylidene fluoride/hexafluoropropylene copolymer having a composition ratio (molar ratio) of 98.6/1.4 was prepared by suspension polymerization.

A separator of Example 2 was produced in a manner similar to that in Example 1, except that the above resin was used as polyvinylidene fluoride resin A. Then, a test battery of Example 2 was produced in a manner similar to that in Example 1.

The physical properties and evaluation results of the separator and test battery of Example 2 are shown in Table 1 and Table 2.

Example 3

A separator of Example 3 was produced in a manner similar to that in Example 1, except that the mixing ratio of the polyvinylidene fluoride resin A and the polyvinylidene fluoride resin B was changed to 10/90. Further, a test battery of Example 3 was produced in a manner similar to that in Example 1.

The physical properties and evaluation results of the separator and test battery of Example 3 are shown in Table 1 and Table 2.

Example 4

A separator of Example 4 was produced in a manner similar to that in Example 1, except that the mixing ratio of the polyvinylidene fluoride resin A and the polyvinylidene fluoride resin B was changed to 20/80. Further, a test battery of Example 4 was produced in a manner similar to that in Example 1.

The physical properties and evaluation results of the separator and test battery of Example 4 are shown in Table 1 and Table 2.

Example 5

A separator of Example 5 was produced in a manner similar to that in Example 1, except that the mixing ratio of the polyvinylidene fluoride resin A and the polyvinylidene fluoride resin B was changed to 80/20. Further, a test battery of Example 5 was produced in a manner similar to that in Example 1.

The physical properties and evaluation results of the separator and test battery of Example 5 are shown in Table 1 and Table 2.

Example 6

A separator of Example 6 was produced in a manner similar to that in Example 1, except that the mixing ratio of the polyvinylidene fluoride resin A and the polyvinylidene fluoride resin B was changed to 90/10. Further, a test battery of Example 6 was produced in a manner similar to that in Example 1.

The physical properties and evaluation results of the separator and test battery of Example 6 are shown in Table 1 and Table 2.

Example 7

As polyvinylidene fluoride resin A, a vinylidene fluoride/hexafluoropropylene copolymer having a composition ratio (molar ratio) of 99.0/1.0 was prepared by suspension polymerization.

A separator of Example 7 was produced in a manner similar to that in Example 1, except that the above resin was used as polyvinylidene fluoride resin A. Then, a test battery of Example 7 was produced in a manner similar to that in Example 1.

The physical properties and evaluation results of the separator and test battery of Example 7 are shown in Table 1 and Table 2.

Comparative Example 1

A vinylidene fluoride/hexafluoropropylene copolymer having a composition ratio (molar ratio) of 99.7/0.3 was prepared by suspension polymerization.

A separator of Comparative Example 1 was produced in a manner similar to that in Example 1, except that the above resin was used instead of using the polyvinylidene fluoride resin A. Then, a test battery of Comparative Example 1 was produced in a manner similar to that in Example 1.

The physical properties and evaluation results of the separator and test battery of Comparative Example 1 are shown in Table 1 and Table 2.

Comparative Example 2

A vinylidene fluoride/hexafluoropropylene copolymer having a composition ratio (molar ratio) of 98.0/2.0 was prepared by suspension polymerization.

A separator of Comparative Example 2 was produced in a manner similar to that in Example 1, except that the above resin was used instead of using the polyvinylidene fluoride resin A. Then, a test battery of Comparative Example 2 was produced in a manner similar to that in Example 1.

The physical properties and evaluation results of the separator and test battery of Comparative Example 2 are shown in Table 1 and Table 2.

Comparative Example 3

A polyvinylidene fluoride resin (homopolymer of vinylidene fluoride; weight average molecular weight of 350,000) was prepared.

A separator of Comparative Example 3 was produced in a manner similar to that in Example 1, except that the above resin was used instead of using the polyvinylidene fluoride resin A. Further, a test battery of Comparative Example 3 was produced in a manner similar to that in Example 1.

The physical properties and evaluation results of the separator and test battery of Comparative Example 3 are shown in Table 1 and Table 2.

Comparative Example 4

A separator of Comparative Example 4 was produced in a manner similar to that in Example 1, except that the polyvinylidene fluoride B was not used and, in place of this, the polyvinylidene fluoride resin A was used. Further, a test battery of Comparative Example 4 was produced in a manner similar to that in Example 1.

The physical properties and evaluation results of the separator and test battery of Comparative Example 4 are shown in Table 1 and Table 2.

Comparative Example 5

A separator of Comparative Example 5 was produced in a manner similar to that in Example 1, except that the polyvinylidene fluoride A was not used and, in place of this, the polyvinylidene fluoride resin B was used. Further, a test battery of Comparative Example 5 was produced in a manner similar to that in Example 1.

The physical properties and evaluation results of the separator and test battery of Comparative Example 5 are shown in Table 1 and Table 2.

Comparative Example 6

A polyvinylidene fluoride resin (homopolymer of vinylidene fluoride; weight average molecular weight of 400,000) and a vinylidene fluoride/hexafluoropropylene copolymer (molar ratio of 94.5/5.5, that is, 88/12 in terms of mass ratio; weight average molecular weight of 270,000) were prepared.

A resin mixture obtained by mixing the above polyvinylidene fluoride resin and the above vinylidene fluoride/hexafluoropropylene copolymer at a mass ratio of 60/40 was dissolved in N-methyl-2-pyrrolidone, to prepare a coating liquid for forming an adhesive porous layer.

Equal amounts of this coating liquid were coated respectively on both sides of a polyethylene microporous membrane (film thickness of 9 μm, Gurley value of 160 sec/100 cc, porosity of 38%) which was used in Example 1, followed by immersion in methanol, to perform solidification.

Subsequently, the resulting membrane was washed with water, followed by drying, to obtain a separator having an adhesive porous layer made of a polyvinylidene fluoride resin formed on both sides of a polyethylene microporous membrane.

Further, a test battery of Comparative Example 6 was produced in a manner similar to that in Example 1.

The physical properties and evaluation results of the separator and test battery of Comparative Example 6 are shown in Table 1 and Table 2.

Comparative Example 7

A vinylidene fluoride/hexafluoropropylene copolymer having a composition ratio (molar ratio) of 98.6/1.4, which was prepared in Example 2, was prepared.

A separator of Comparative Example 7 was produced in a manner similar to that in Example 1, except that the above resin was used instead of using the polyvinylidene fluoride resin B. Then, a test battery of Comparative Example 7 was produced in a manner similar to that in Example 1.

The physical properties and evaluation results of the separator and test battery of Comparative Example 7 are shown in Table 1 and Table 2.

With regard to the separators of Examples 1 to 7, the moisture was vaporized at 120° C. using a vaporizer (model VA-100, manufactured by Mitsubishi Chemical Analytech Co., Ltd.), and thereafter, the moisture content was measured using a Karl Fischer moisture meter (CA-100, manufactured by Mitsubishi Chemical Co., Ltd.). As a result, the moisture contents of all the separators of Examples 1 to 7 were 1,000 ppm or less.

TABLE 1

| | Content of HFP in PVDF Resin (mol %) | | Mixing Ratio of PVDF Resins (Mass Ratio) | | Weight of PVDF Resin | | Adhesive Porous Layer | | Separator | | | |
|---|---|---|---|---|---|---|---|---|---|---|---|---|
| | | | | | Total on Both Sides | Difference between | Porosity | Average Pore Size | Porosity | Film Thickness | Weight per Unit Area | Gurley Value |
| | Resin A | Resin B | Resin A | Resin B | (g/m$^2$) | Two Sides | (%) | (nm) | (%) | (μm) | (g/m$^2$) | (sec/100 cc) |
| Example 1 | 0.6 | 4.8 | 60 | 40 | 2.36 | 0% | 42 | 57 | 39 | 11 | 7.64 | 204 |
| Example 2 | 1.4 | 4.8 | 60 | 40 | 2.23 | 0% | 43 | 63 | 39 | 11 | 7.51 | 204 |
| Example 3 | 0.6 | 4.8 | 10 | 90 | 2.34 | 0% | 52 | 97 | 41 | 12 | 7.62 | 198 |
| Example 4 | 0.6 | 4.8 | 20 | 80 | 2.35 | 0% | 51 | 78 | 41 | 12 | 7.63 | 199 |
| Example 5 | 0.6 | 4.8 | 80 | 20 | 2.29 | 0% | 39 | 40 | 38 | 11 | 7.57 | 208 |
| Example 6 | 0.6 | 4.8 | 90 | 10 | 2.33 | 0% | 34 | 39 | 37 | 11 | 7.61 | 210 |
| Example 7 | 1.0 | 4.8 | 60 | 40 | 2.36 | 0% | 42 | 57 | 39 | 11 | 7.64 | 202 |
| Comparative Example 1 | 0.3 | 4.8 | 60 | 40 | 2.25 | 0% | 35 | 38 | 38 | 11 | 7.53 | 235 |
| Comparative Example 2 | 2.0 | 4.8 | 60 | 40 | 2.36 | 0% | 75 | 685 | 52 | 14 | 7.64 | 191 |

TABLE 1-continued

| | Content of HFP in PVDF Resin (mol %) | | Mixing Ratio of PVDF Resins (Mass Ratio) | | Weight of PVDF Resin | | Adhesive Porous Layer | | Separator | | | |
|---|---|---|---|---|---|---|---|---|---|---|---|---|
| | | | | | Total on Both Sides | Difference between | Porosity | Average Pore Size | Porosity | Film Thickness | Weight per Unit Area | Gurley Value |
| | Resin A | Resin B | Resin A | Resin B | (g/m²) | Two Sides | (%) | (nm) | (%) | (μm) | (g/m²) | (sec/100 cc) |
| Comparative Example 3 | 0 | 4.8 | 60 | 40 | 2.24 | 0% | 30 | 22 | 37 | 11 | 7.52 | 259 |
| Comparative Example 4 | 0.6 | — | 100 | 0 | 2.51 | 0% | 79 | 1231 | 56 | 16 | 7.79 | 196 |
| Comparative Example 5 | — | 4.8 | 0 | 100 | 2.52 | 0% | 25 | 18 | 36 | 11 | 7.80 | 586 |
| Comparative Example 6 | 0 | 5.5 | 60 | 40 | 4.45 | 0% | 75 | 1450 | 57 | 19 | 9.73 | 295 |
| Comparative Example 7 | 0.6 | 1.4 | 60 | 40 | 2.24 | 0% | 37 | 35 | 38 | 11 | 7.52 | 240 |

TABLE 2

| | Physical Properties of Separator | | | Cycle Characteristic (%) | Load Characteristic (%) |
|---|---|---|---|---|---|
| | Peel Force (N/cm) | Membrane Resistance (ohm·cm²) | Adhesion to Electrode | | |
| Example 1 | 0.15 | 3.04 | 100 | 96 | 95 |
| Example 2 | 0.14 | 3.09 | 104 | 97 | 96 |
| Example 3 | 0.14 | 3.01 | 96 | 96 | 96 |
| Example 4 | 0.14 | 2.99 | 99 | 96 | 96 |
| Example 5 | 0.17 | 3.10 | 99 | 95 | 94 |
| Example 6 | 0.18 | 3.11 | 98 | 96 | 95 |
| Example 7 | 0.15 | 3.05 | 99 | 97 | 95 |
| Comparative Example 1 | 0.14 | 3.14 | 63 | 85 | 92 |
| Comparative Example 2 | 0.18 | 4.10 | 71 | 75 | 93 |
| Comparative Example 3 | 0.19 | 3.18 | 61 | 79 | 94 |
| Comparative Example 4 | 0.10 | 3.54 | 59 | 55 | 93 |
| Comparative Example 5 | 0.11 | 5.31 | 53 | 32 | 41 |
| Comparative Example 6 | 0.35 | 6.01 | 80 | 35 | 35 |
| Comparative Example 7 | 0.13 | 3.15 | 65 | 76 | 90 |

As is evident from Table 1, in the separators of Examples 1 to 7, as shown from the porosities and pore sizes of the adhesive porous layers, the adhesive porous layers had a favorable porous structure.

As is evident from Table 2, the separators of Examples 1 to 7 exhibited excellent adhesion to electrodes. Further, the batteries produced by using the separators of Examples 1 to 7 exhibited excellent cycle characteristics and excellent load characteristics.

Examples 101 to 103

The coating liquids for forming an adhesive porous layer, which were prepared in Examples 1, 2, and 7, were each placed in a bottle made of polyethylene, followed by putting a lid on it. These bottles were left in a dark place for 24 hours under 20° C.

Using the respective coating liquids after leaving, separators of Examples 101 to 103 were produced in a manner similar to that in Example 1. Then, test batteries of Examples 101 to 103 were produced in a manner similar to that in Example 1.

The evaluation results of the separators and test batteries of Examples 101 to 103 are shown in Table 3. Further, the viscosity ratio of the coating liquid before and after leaving is shown in Table 3.

Comparative Examples 101 to 104

The coating liquids for forming an adhesive porous layer, which were prepared in Comparative Examples 1 to 3, and 6, were each placed in a bottle made of polyethylene, followed by putting a lid on it. These bottles were left in a dark place for 24 hours under 20° C.

Using the respective coating liquids after leaving, separators of Comparative Examples 101 to 104 were produced in a manner similar to that in Example 1. Then, test batteries of Comparative Examples 101 to 104 were produced in a manner similar to that in Example 1.

The evaluation results of the separators and test batteries of Comparative Examples 101 to 104 are shown in Table 3. Further, the viscosity ratio of the coating liquid before and after leaving is shown in Table 3.

With regard to Comparative Example 103 and Comparative Example 104, a part of the coating liquid was gelled due to leaving for 24 hours, and therefore, measurement of viscosity after leaving was not carried out. In Comparative Example 103 and Comparative Example 104, the coating liquid after leaving, a part of which was gelled, was stirred and used for forming an adhesive porous layer.

TABLE 3

| | Origin of Coating Liquid | Viscosity Ratio of Coating Liquid Before and After Leaving | Occurrence of Streaks | Cycle Characteristic (%) |
|---|---|---|---|---|
| Example 101 | Example 1 | 1.02 | A | 94 |
| Example 102 | Example 2 | 1.01 | A | 96 |
| Example 103 | Example 7 | 1.02 | A | 94 |
| Comparative Example 101 | Comparative Example 1 | 58.3 | B | 68 |
| Comparative Example 102 | Comparative Example 2 | 1.01 | A | 75 |
| Comparative Example 103 | Comparative Example 3 | — | C | 20 |
| Comparative Example 104 | Comparative Example 6 | — | C | 30 |

As is evident from Table 3, in the coating liquids prepared in Examples 1, 2, and 7, change in viscosity between the coating liquid before and after leaving was hardly seen.

In the separators of Examples 101 to 103, occurrence of streaks, which exert influence on the adhesion to electrodes, was not recognized at the surface of the adhesive porous layer. The batteries produced by using the separators of Examples 101 to 103 exhibited excellent cycle characteristics.

INDUSTRIAL APPLICABILITY

The separator of the invention is suitable for use in a non-aqueous electrolyte battery. The separator is particularly suitable for use in a non-aqueous electrolyte battery having an aluminum laminate outer casing.

The disclosure of Japanese Patent Application No. 2011-231833 filed on Oct. 21, 2011 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, comprising:
    a porous substrate, and
    an adhesive porous layer that is coated on one side or both sides of the porous substrate and contains the following polyvinylidene fluoride resin A and the following polyvinylidene fluoride resin B:
    Polyvinylidene fluoride resin A: a polyvinylidene fluoride resin containing structural units derived from vinylidene fluoride and structural units derived from hexafluoropropylene, a total content ratio of structural units derived from hexafluoropropylene in each of the vinylidene fluoride copolymers being from 0.6 mol % to 1.5 mol % of a total content of structural units in each of the vinylidene fluoride copolymers; and
    Polyvinylidene fluoride resin B: a polyvinylidene fluoride resin containing structural units derived from vinylidene fluoride and structural units derived from hexafluoropropylene, a total content ratio of structural units derived from hexafluoropropylene in each of the vinylidene fluoride copolymers being greater than 1.5 mol % to 15 mol % or less of a total content of structural units in each of the vinylidene fluoride copolymers,
    wherein a mass ratio of the polyvinylidene fluoride resin A and the polyvinylidene fluoride resin B (polyvinylidene fluoride resin A:polyvinylidene fluoride resin B) in the adhesive porous layer is from 10:90 to 35:65.

2. The separator for a non-aqueous secondary battery according to claim 1, wherein the adhesive porous layer has a porosity of from 30% to 60% and an average pore size of from 20 nm to 100 nm.

3. The separator for a non-aqueous secondary battery according to claim 1, wherein an amount per unit area of the adhesive porous layer at one side of the porous substrate is from 0.5 g/m$^2$ to 1.5 g/m$^2$.

4. The separator for a non-aqueous secondary battery according to claim 1, wherein the difference between the Gurley value of the porous substrate and the Gurley value of the separator including an adhesive porous layer formed on the porous substrate is 300 sec/100 cc or less.

5. The separator for a non-aqueous secondary battery according to claim 1, wherein the polyvinylidene fluoride resin A and the polyvinylidene fluoride resin B are each a copolymer consisting of only vinylidene fluoride and hexafluoropropylene, and
    the resin A and the resin B each have a weight average molecular weight of from 400,000 to 1,500,000.

6. The separator for a non-aqueous secondary battery according to claim 1, wherein
    the polyvinylidene fluoride resin A and the polyvinylidene fluoride resin B are bound together to form a porous structure by being dissolved and blended together in a state in which the polyvinylidene fluoride resin A and the polyvinylidene fluoride resin B are in a solvent.

7. A non-aqueous secondary battery comprising a positive electrode, a negative electrode, and the separator for a non-aqueous secondary battery according to claim 1, the separator being disposed between the positive electrode and the negative electrode, wherein, in the non-aqueous secondary battery, electromotive force is obtained by lithium doping/dedoping.

* * * * *